United States Patent
Förtsch et al.

(10) Patent No.: US 8,667,492 B2
(45) Date of Patent: Mar. 4, 2014

(54) CONTROL OF THE RUNTIME BEHAVIOR OF PROCESSES

(75) Inventors: Rainer Förtsch, Kleinsendelbach (DE); Franz-Josef Götz, Heideck (DE); Jürgen Haardörfer, Rosstal (DE); Christian Strömsdörfer, Nürnberg (DE); Frank Volkmann, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 880 days.

(21) Appl. No.: 12/525,102

(22) PCT Filed: Jan. 31, 2007

(86) PCT No.: PCT/DE2007/000176
§ 371 (c)(1),
(2), (4) Date: Jul. 30, 2009

(87) PCT Pub. No.: WO2008/092412
PCT Pub. Date: Aug. 7, 2008

(65) Prior Publication Data
US 2010/0070977 A1    Mar. 18, 2010

(51) Int. Cl.
*G06F 9/46* (2006.01)
(52) U.S. Cl.
USPC ............................... 718/102; 718/103
(58) Field of Classification Search
None
See application file for complete search history.

(56) References Cited

U.S. PATENT DOCUMENTS 6,108,683 A * 8/2000 Kamada et al. ............... 718/103
6,434,230 B1 * 8/2002 Gabriel .................... 379/265.01

FOREIGN PATENT DOCUMENTS

EP      0647903 A1    4/1995

OTHER PUBLICATIONS

Manfred Moser; Sebstian Engell, "A Survey of Priority Rules for FMS Scheduling and Their Performance for the Benchmark Problem", 1992 IEEE, Proceedings of the $31^{st}$ Conference on Decision and Control, Tucson, Arizona, Dec. 1992, pp. 392-397.

* cited by examiner

*Primary Examiner* — Meng An
*Assistant Examiner* — Wissam Rashid

(57) ABSTRACT

A method for controlling runtime behavior of processes of an automation system is provided. A priority is assigned to each of the processes, wherein an operating system of the automation system assigns runtime to the processes as a function of their priority. A scheduling service monitors starting and ending of all processes, wherein the highest priority available in the operating system is assigned to the scheduling service. Metadata is assigned to at least one process, the data including at least one rule on the priority of the process. The scheduling service analyzes the metadata and registers the process for monitoring when starting a process to which metadata is assigned, wherein the scheduling service monitors the registered processes for compliance with the at least one rule per process, and wherein the scheduling service modifies the priorities of the registered processes, the at least one rule of which is in non-compliance, according to the rule.

20 Claims, 2 Drawing Sheets

CONTROL OF THE RUNTIME BEHAVIOR OF PROCESSES

CROSS REFERENCE TO RELATED APPLICATIONS

This application is the US National Stage of International Application No. PCT/DE2007/000176 filed Jan. 31, 2007, claims the benefit thereof and is incorporated by reference herein in its entirety.

FIELD OF INVENTION

The invention relates to a method for controlling the runtime behavior of processes of an automation system as well as to a corresponding automation system.

BACKGROUND OF INVENTION

Such a method or automation system is employed in the area of automation technology in which a number of tasks often have to be fulfilled simultaneously. To control complex processes such as the production of automobiles in a plant for example, software systems are used which consist of a number of programs or processes (e.g. production data capture, control of the systems, capture and editing of operating data/statistics etc.). These processes must divide up the available computing power between them or must share the computing power with other systems respectively. The allocation of the computing power to processes is generally undertaken using the priorities of the corresponding processes. In such cases the priorities of the corresponding processes are not to be seen as equal over their entire runtime, but as dependent for example on times of day (typically generating statistics at the end of the shift) or operating states. If these framework conditions change, the priorities of the processes should be adapted accordingly to achieve optimum task processing.

In the multitasking operating systems which are the norm these days (e.g. Windows, Linux) processes are allocated specific time slices for execution of depending on their priority. This means that processes or threads (subunits of processes for parallel execution of different logical program execution parts) to which a high priority has been assigned are given preference for execution whereas on the other hand other waiting processes or threads with lower priority must continue to wait. Processes/threads are assigned a priority either by the operating system by default or programmatically (by the process itself or by another process with corresponding rights), which thus essentially determines the execution sequence of the processes/threads of the system. Depending on priorities allocated to processes, the allocation of computing power is undertaken by the operating system.

In the usual operating systems employed nowadays the priority of processes/threads is the sole decisive factor governing the runtime behavior since the corresponding scheduler of the operating system does not have any additional semantic information about the processes involved or about their tasks which it can use for a decision about the allocation of computing power. Nor can this be expected with multipurpose operating systems, since a generalizing approach must be adopted here. To adapt the runtime behavior of the individual processes to changes in peripheral conditions (peripheral time conditions such as shift end or event-controlled peripheral conditions) there was previously only the option of making priority decisions and changes programmatically within the processes themselves.

SUMMARY OF INVENTION

This is however extremely difficult and not generally rewarded by success since on the one hand such changes only occur within the local scope of the process and on the other hand even at development time of the individual processes of a system there must be an agreement as to the conditions under which a change in the control of the priorities of the processes should be undertaken or as to which processes must co-operate later in a complex system. Therefore priority controls which encompass all processes are mostly dispensed with nowadays. This is left to the standard behavior of the operating system. The difficulty is also that in specific situations (e.g. conflicts between different threads when accessing resources) the operating system itself changes priorities (keyword "priority inversion") in order to resolve such resource conflicts. The processes involved only find out about a corresponding process change if they monitor their own priority setting accordingly. Mostly this is not the case in practice so that the consequence of a resource conflict can include a change to the runtime behavior of the entire system so that the planned tasks can no longer be fulfilled. There has thus not been any satisfactory solution so far to controlling the runtime behavior of a complex, dynamic system.

An object of the invention is to propose reliable and dynamic control of the runtime behavior of the processes of a system from automation technology, based on an operating system such as Windows or Linux for example.

A further object of the invention is to specify an automation system with an operating system, such as Windows or Linux for example, in which reliable and dynamic control of the runtime behavior of processes is possible.

This object is achieved by a method for controlling the runtime behavior of processes of an automation system with an operating system, with the processes being assigned a priority in each case, with the operating system assigning runtime to the processes depending on their priority, with a scheduling service monitoring the starting and ending of all processes, with the scheduling service being assigned the highest priority in the operating system, with at least one process being assigned metadata which contains at least one rule about the priority of the process, with the scheduling service, when a process to which metadata is assigned is started, evaluating the metadata and registering the process for monitoring, with the scheduling service monitoring the registered process for adherence to at least one rule per process and with the scheduling service changing the priorities of the registered processes for which the at least one rule has not been adhered to in accordance with the rule.

The object is further achieved by an automation system as claimed in the claims.

The processes involved in an automation task (i.e. at least one of them) will thus be assigned by the inventive method properties relating to the priority of the respective process—metadata or metainformation, since the priority already represents the type of property of the respective process—which defines the peripheral conditions for the runtime behavior (e.g. time conditions such as shift end). These properties can be integrated for example into the process or into the respective program (e.g. binary) or will be provided via interprocess communication mechanisms or by a combination of the said options. The inventive method is independent of the type of provision of the property information (metadata). If no such metadata is predetermined the standard behavior of the operating system for this process applies. This also applies to further processes which are not involved in the automation task. The additional specific scheduling service also needed is always registered with the highest priority in the operating system and monitors which processes are being started and ended. If the process is involved which also provides the above-mentioned properties (metadata), then this data is evaluated at the start of the corresponding process and the processes flagged in advance for further monitoring and administration. The scheduling service thus monitors all processes (and their threads) which offer the corresponding properties in respect of their priority and intervenes to make priority changes if necessary. The actual scheduling of the processes is still undertaken by the underlying operating system.

The scheduling based on properties of processes allows a separation of the development of the necessary applications and the project planning of a specific system which needs a number of applications in combination. Otherwise the applications and also scheduling-relevant information involved (e.g. shift times) would already have to be known at the time of development of all applications involved and would have to be tuned to each other. However the complexity of current systems means that this is barely possible. In addition a later change in the number or combination of interoperating applications, as a result of changed shift times for example, would not be easily possible. A decisive advantage of the inventive method is thus the separation in the conventional application development of the necessary applications and in the capability to insert metainformation describing the applications/processes (process properties) for a later plant-specific use (division of work, development, project planning/system integration) which allows a flexibility in relation to taking into account individual properties of the system.

Processes which do not support (offer) any metadata can continue to be operated in such cases. They are thus subject to sole administration by the operating system. This guarantees compatibility with systems without the specialized scheduling service, so that processes with metadata and those without metadata can be operated jointly and without changes.

The scheduling service and the attributable processes additionally allow an allocation/administration of the resource computing power with a finer granularity or greater efficiency. The available computing power can be better employed in accordance with the tasks to hand since additional information relating to the administration is provided by the metadata. The result of this can be savings in hardware since the more efficient utilization of resources may allow lower-performance hardware to be employed, which as a rule is also more reasonably priced.

In addition typical programs with resource conflicts in the current systems (e.g. "priority inversion") can at least be avoided for processes with property constraints by the scheduling service. The use of property values for process scheduling allows a flexible synchronization of all processes involved in a solution in accordance with any given criteria.

In an advantageous form of embodiment the scheduling service is integrated into the operating system. The specialized scheduling service which takes into consideration the properties of processes can be realized in a variety of alternatives, depending on which options are available for integration into an existing operating system (use of standard Windows products or a separate Linux distribution which allows a better integration). Depending on how the scheduling services integrated a more exact control of the processes with property constraints is possible. An integration of the specific scheduling service into the operating system itself allows the properties of the processes to be taken into account very precisely. A realization of the scheduling service as a service or as a separate process only allows an imprecise control since then the scheduling service and the monitored processes under property constraints are subject to the scheduling method of the underlying operating system. Despite this, this should still be sufficient for most automation applications, provided there are no rigid real time requirements in place. A simple integration into existing multipurpose operating systems is also possible with the inventive method. The new scheduling service would be seen as a supplement to computing time management by the operating system. In the simplest case no change to the operating system would be necessary.

In a further advantageous embodiment the metadata of at least one process is stored in an additional file. This can be done for example by files installed in parallel to the programs with corresponding name conventions which make it possible to find the files, which allow a simple change to the metadata even during the ongoing operation of a system. If the properties of the process are thus provided externally, i.e. outside the programs, the property concept can be applied to any applications without the applications concerned having to be adapted themselves.

In a further advantageous embodiment the metadata of least one process is stored in a central property service. A simple change to the metadata even during ongoing operation of the system is also made possible in this case with all properties of the processes involved able to be changed centrally by the central storage. In this case the properties of the processes can be provided for example by the central property service via a server. And also in this case, as in the previous exemplary embodiment, the property concept can be applied to any given applications, without the applications involved having to be adapted themselves.

In a further advantageous embodiment the metadata of at least one process contains at least one rule dependent on at least one other process. This allows the scheduling service to recognize dependencies to other processes and intervene appropriately for regulation.

In a further advantageous embodiment the metadata of at least one process contains at least one rule about the priority of another process. This enables it to be flagged in the metadata of a process for example that at specific times at which this process is to run with high priority, all other processes (or even only a few thereof) continue to run with lower priority, without this having to be flagged for all other processes.

In a further advantageous embodiment at least one process informs the scheduling service about the entry of an event. To be able to react dynamically to events, the scheduling service offers the corresponding interfaces via standard interprocess communication mechanisms. This means that the processes with property constraints have the option of informing the scheduling service about the entry of relevant events. The scheduling service can thus react to the event in accordance with the properties of the processes involved in order to control priorities.

In a further advantageous embodiment the scheduling service will be assigned at least one property by means of which the scheduling behavior will be configured. I.e. the service itself can also have properties (metadata) which influence its behavior and thus allow a flexible configuration of the scheduling behavior.

In a further advantageous embodiment of the metadata, the at least one process contains a least one item of information relating to a non-priority-specific area, such as especially access protection or system resource administration, which will be evaluated by the scheduling service or by a special service provided for the purpose. In this way the concept of enhancing processes of a system with metainformation for facilitating subsequent task-specific synchronization can also be extended to other areas as well as scheduling (e.g. security concepts, access protection, system resource administration, asset management etc., just to give a few examples).

BRIEF DESCRIPTION OF THE DRAWINGS

The invention is described in more detail and explained below with reference to the exemplary embodiments shown in the figures. The figures show.

DETAILED DESCRIPTION OF INVENTION

Figure 1:
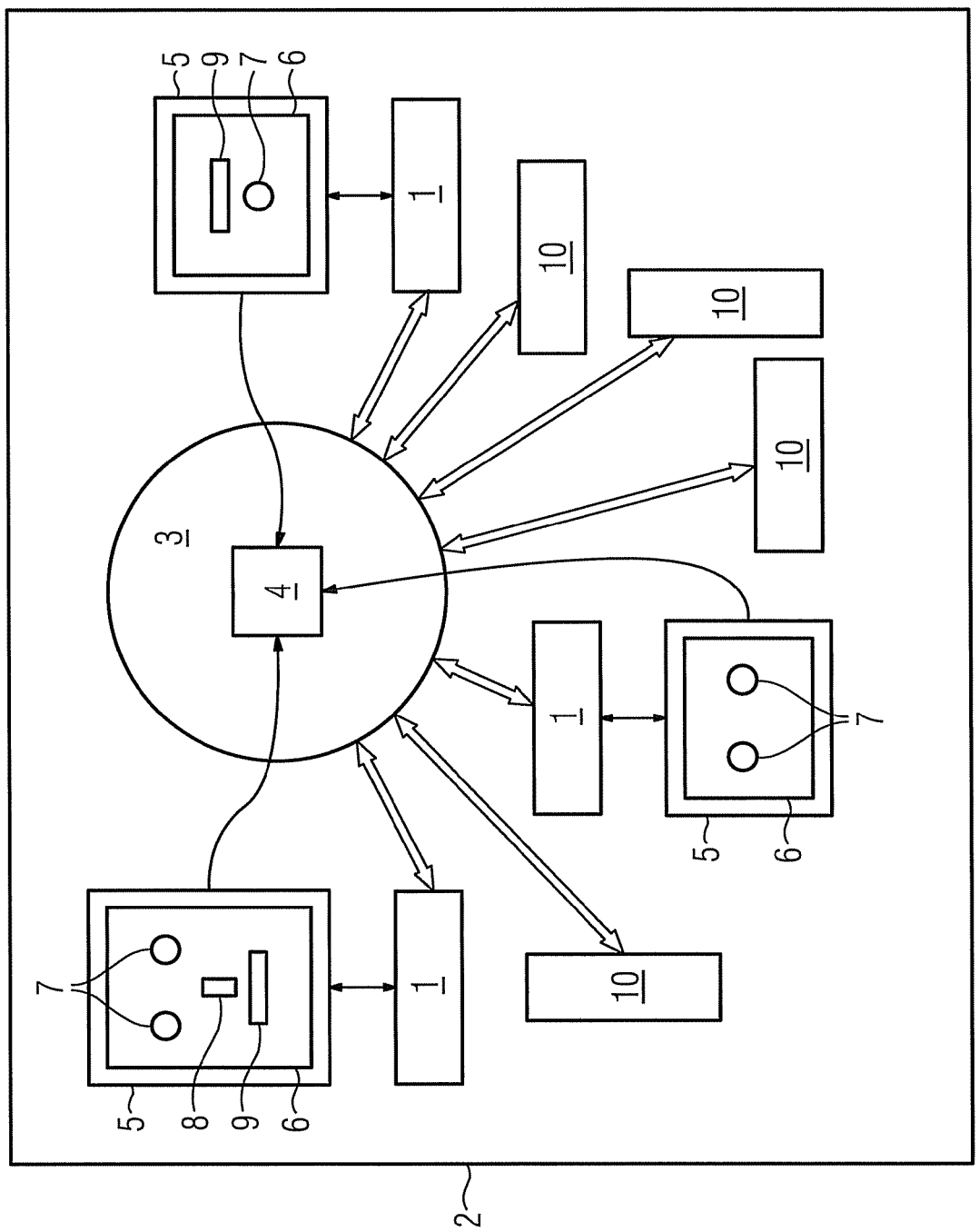
FIG. 1 a schematic diagram of processes in an automation system.

FIG. 1 shows us the a diagram of processes 1, 10 in an automation system 2 with an operating system 3, with each of the processes 1, 10 being assigned a priority and the operating system assigning runtime to the processes 1, 10 depending on their priority. A few processes 1 are assigned metadata 6 in this case which contains at least one rule 7, 8 about the priority of the respective process 1, with the least one rule 7, 8 able to be independent 7 or dependent 8 on another process. The metadata 6 can additionally also contain rules 9 about the priority of another process 1, 10. The metadata 6 is stored in the exemplary embodiment depicted in separate files 5, so that they can also be changed during ongoing operation of the automation system 2. In addition the storage of the metadata 6 in separate files 5 allows the attribute concept to be applied or expanded to any given applications 1, 10 without the applications 1, 10 involved having to be adapted themselves, be it through creation of a new file 5 with metadata 6 for a process 10 previously having no properties or through acceptance of a rule 7-9, with the rule 9 also being able to relate to the priority of another process, in an existing file 5.

Integrated into the operating system 3 of the automation system 2 is a scheduling service, which monitors the starting and ending of processes 1, 10. The scheduling service 4 always runs at the highest priority in the operating system 3. If a process 1 is started to which metadata 6 is assigned, this data is evaluated by the scheduling service 4 and the process 1 is flagged in advance for further monitoring and administration. If the priority of a monitored process 1 now does not correspond to the priority in accordance with the rule 7-9, the scheduling service 4 intervenes to change the priority. This will be done in the normal case if an event predetermined in rules 7-9 occurs and the scheduling service 4 adapts the priority of the process 1 in accordance with the rules 7-9, a change in the priorities can however also be initiated for resource conflicts by the operating system 3 in order to resolve the conflicts (keyword "priority inversion"). In each case it is assured for the monitored processes 1 that their priority corresponds to rules 7-9. For the non-monitored processes 10 to which no metadata 6 is assigned, the standard behavior of the operating system 3 applies. It should be noted in this case that processes 1, 10 can also be assigned metadata 6 without a file 5 with metadata 6 being assigned to them, for example by rules 9 in the files 5 about priorities of other processes 1, 10 or by a central property service. However this is not the case in the example depicted.

Figure 2:
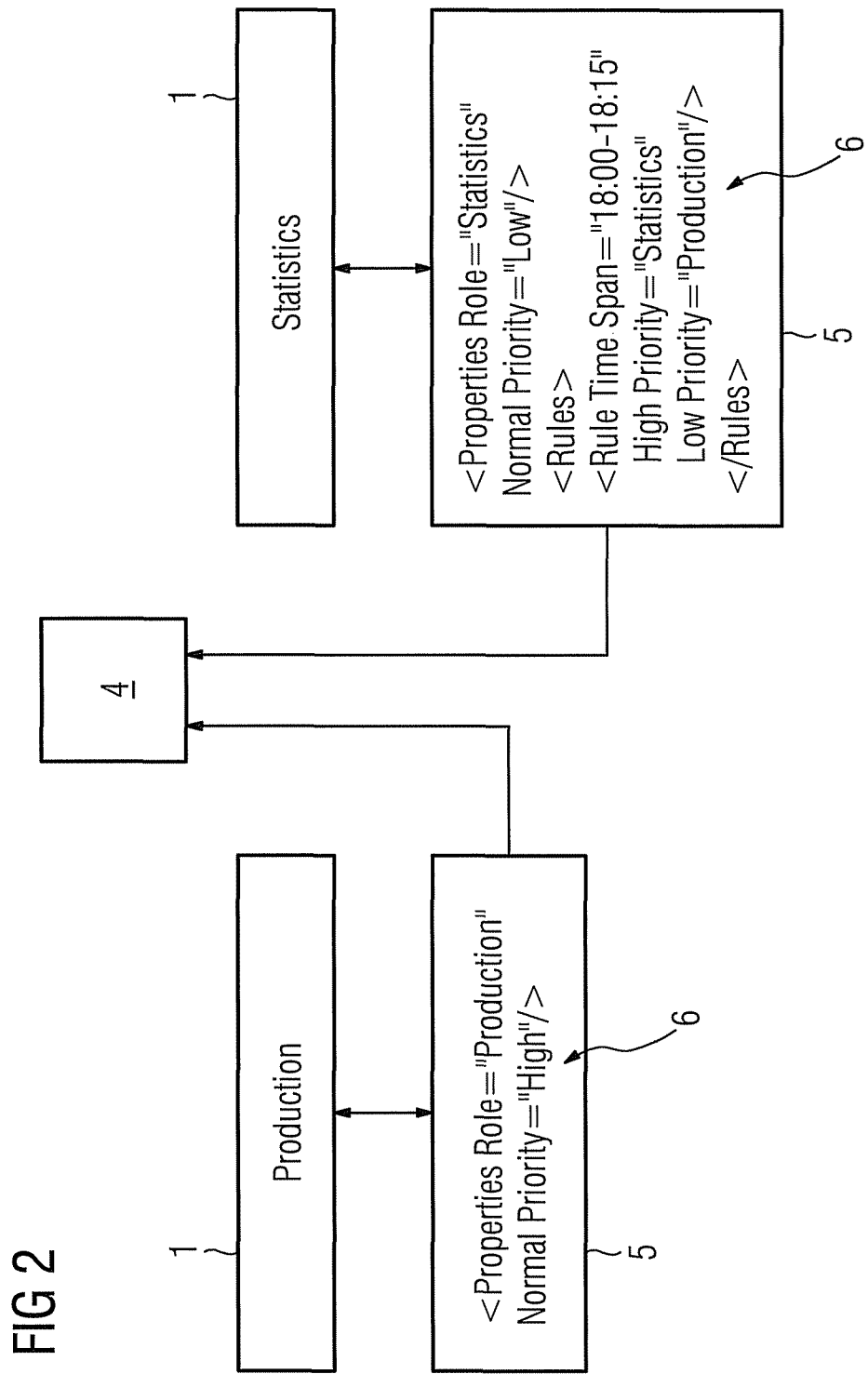
FIG. 2 a typical application with metadata assigned to processes.

FIG. 2 shows an application example with metadata 6 assigned to processes 1. Two applications 1 are involved in this simplified scenario, from the automobile industry for example: A production control and monitoring process ("Production", App1.exe) as well as a process for creation of operating statistics ("Statistics", App2.exe). The two applications 1 are to operate permanently in parallel in 24/7 operation during the normal production times of the automobile plant. During each change of shift production is stopped or reduced and the operating statistics for the past shift created (e.g. vehicles produced in accordance with specific criteria, material consumption, faults etc.). This means that the creation of the operating statistics is to receive a higher priority at the respective change of shift than production control and monitoring. Despite this the two processes 1 should continue to run continuously. Such a dependence of process priorities on the operating times can be resolved via metadata 6 of the processes 1 concerned and the specialized scheduling service 4.

This metadata 6 is stored in the scenario depicted in separate files which are typically governed by a simple naming convention to allow easy location. App1.exe.properties or App2.exe.properties respectively. In this case it is noted in the metadata 6 of the "production" process that it is normally to run with high priority, whereas in the properties 6 of process 1 for creating the operating statistics it is noted that only a low priority of the process is needed during the production periods. For the period immediately at a change of shift on the other hand, for a specific period of time (15 minutes in the example) a high priority should be used for the (statistics) process 1, while the "production" 1 is set to a low priority. In this case the last-mentioned rule is also stored in the metadata 6 for the "statistics" process 1, meaning that it is an example of the rule 9 described in FIG. 1 about the priority of another process 1.

Instead of the definition of a period of 15 minutes, the end of the creation of statistics could also be signaled to the scheduling service 4 by setting a corresponding scheduling event, which subsequently lets the processes 1 then run again at their normal priority. Another conceivable version relates to the definition of the priorities per se: Instead of letting the processes 1 run depending on the point in time with high or low priority respectively, the "production" process 1 could for example also always run with normal priority, while the "statistics" process 1 normally runs with low priority and will only be set to high priority for creating the statistics at shift change. In this way the priority of "production" would not have to be changed at all. In each case the runtime, i.e. the computing time components, of the process 1 will be allocated precisely via the scheduling service 4 in accordance with timing sequences.

In summary the invention relates to the control of the runtime behavior of processes of an automation system. A method is proposed for reliable and dynamic control of the runtime behavior, with the processes being assigned a priority in each case, with the operating system of the automation system assigning runtime to the processes depending on their priority, with a scheduling service monitoring the starting and ending of all processes, with the scheduling process being assigned the highest priority in the operating system, with the least one process being assigned metadata which contains at least one rule about the priority of the process, with the scheduling service, on starting the process, being assigned the metadata, evaluating the metadata and registering the process for monitoring, with the scheduling service monitoring the registered process for adherence to the at least one rule per process and with the scheduling service changing the priorities of the registered processes of which the at least one rule is not adhered to in accordance with the rule.

The invention claimed is:

1. A method for controlling a runtime behavior of processes of an automation system with an operating system, comprising:
   assigning a priority to each of the processes;
   assigning runtime to the processes depending on their priority by the operating system;
   monitoring starting and ending of all processes by a scheduling service;
   assigning a highest priority in the operating system to the scheduling service;
   assigning metadata to at least one process, the metadata containing at least one rule about the priority of the process;
   evaluating whether a process is assigned the metadata by the scheduling service when the process is started; and
   registering the process for monitoring if the process is assigned the metadata;
   monitoring the registered process for adherence to the at least one rule per process by the scheduling service; and
   changing the priorities by the scheduling service of those registered processes of which the at least one rule is not adhered to in accordance with the rule.

2. The method as claimed in claim 1, wherein the scheduling service is integrated into the operating system.

3. The method as claimed in claim 1, wherein the metadata of at least one process are stored in a separate file.

4. The method as claimed in claim 2, wherein the metadata of at least one process are stored in a separate file.

5. The method as claimed in claim 1, wherein the metadata of at least one process are stored in a central property service.

6. The method as claimed in claim 2, wherein the metadata of at least one process are stored in a central property service.

7. The method as claimed in claim 1, wherein the metadata of at least one process contain a rule dependent on at least one other process.

8. The method as claimed in claim 1, wherein the metadata of at least one process contain at least one rule about the priority of another process.

9. The method as claimed in claim 1, wherein at least one process informs the scheduling service about an entry of an event.

10. The method as claimed in claim 1, wherein at least a property is assigned to the scheduling service, the property being assigned to configure a behavior of the scheduling service.

11. The method as claimed in claim 1, wherein the metadata of at least one process contain information relating to a non-priority-specific area, the information being evaluated by the scheduling service or by a service specifically provided for the purpose.

12. The method as claimed in claim 9, wherein the non-priority-specific area is an access protection or a system resource administration.

13. An automation system, comprising:
   an operating system;
   a memory that stores program code and one or more processors that execute the program code stored in the memory to perform the following steps:
   assigning a priority to each of a plurality of processes;
   assigning runtime to the processes depending on their priority by the operating system;
   monitoring starting and ending of all processes by a scheduling service;
   assigning a highest priority in the operating system to the scheduling service;
   assigning metadata to at least one process, the metadata containing at least one rule about the priority of the process;
   evaluating whether a process is assigned the metadata by the scheduling service when the process is started; and
   registering the process for monitoring if the process is assigned the metadata;
   monitoring the registered process for adherence to the at least one rule per process by the scheduling service; and
   changing the priorities by the scheduling service of those registered processes of which the at least one rule is not adhered to in accordance with the rule.

14. A non-transitory computer readable medium encoded with instructions that, when executed on a computer system, perform a method for controlling a runtime behavior of processes of an automation system with an operating system, the method comprising:
   assigning a priority to each of the processes;
   assigning runtime to the processes depending on their priority by the operating system; monitoring starting and ending of all processes by a scheduling service;
   assigning a highest priority in the operating system to the scheduling service;
   assigning metadata to at least one process, the metadata containing at least one rule about the priority of the process;
   evaluating whether a process is assigned the metadata by the scheduling service when the process is started and registering the process for monitoring if the process is assigned the metadata;
   monitoring the registered process for adherence to the at least one rule per process by the scheduling service; and
   changing the priorities by the scheduling service of those registered processes of which the at least one rule is not adhered to in accordance with the rule.

15. The non-transitory computer readable medium as claimed in claim 14, wherein the scheduling service is integrated into the operating system.

16. The non-transitory computer readable medium as claimed in claim 14, wherein the metadata of at least one process are stored in a separate file.

17. The non-transitory computer readable medium as claimed in claim 14, wherein the metadata of at least one process are stored in a central property service.

18. The non-transitory computer readable medium as claimed in claim 14, wherein the metadata of at least one process contain a rule dependent on at least one other process.

19. The non-transitory computer readable medium as claimed in claim 14, wherein the metadata of at least one process contain at least one rule about the priority of another process.

20. The non-transitory computer readable medium as claimed in claim 14, wherein at least a property is assigned to the scheduling service, the property being assigned to configure a behavior of the scheduling service.

* * * * *